July 13, 1926. 1,592,772
F. BERGIUS
PROCESS FOR TREATING CARBON AND CARBON COMPOUNDS UNDER HEAT AND PRESSURE
Filed August 30, 1921
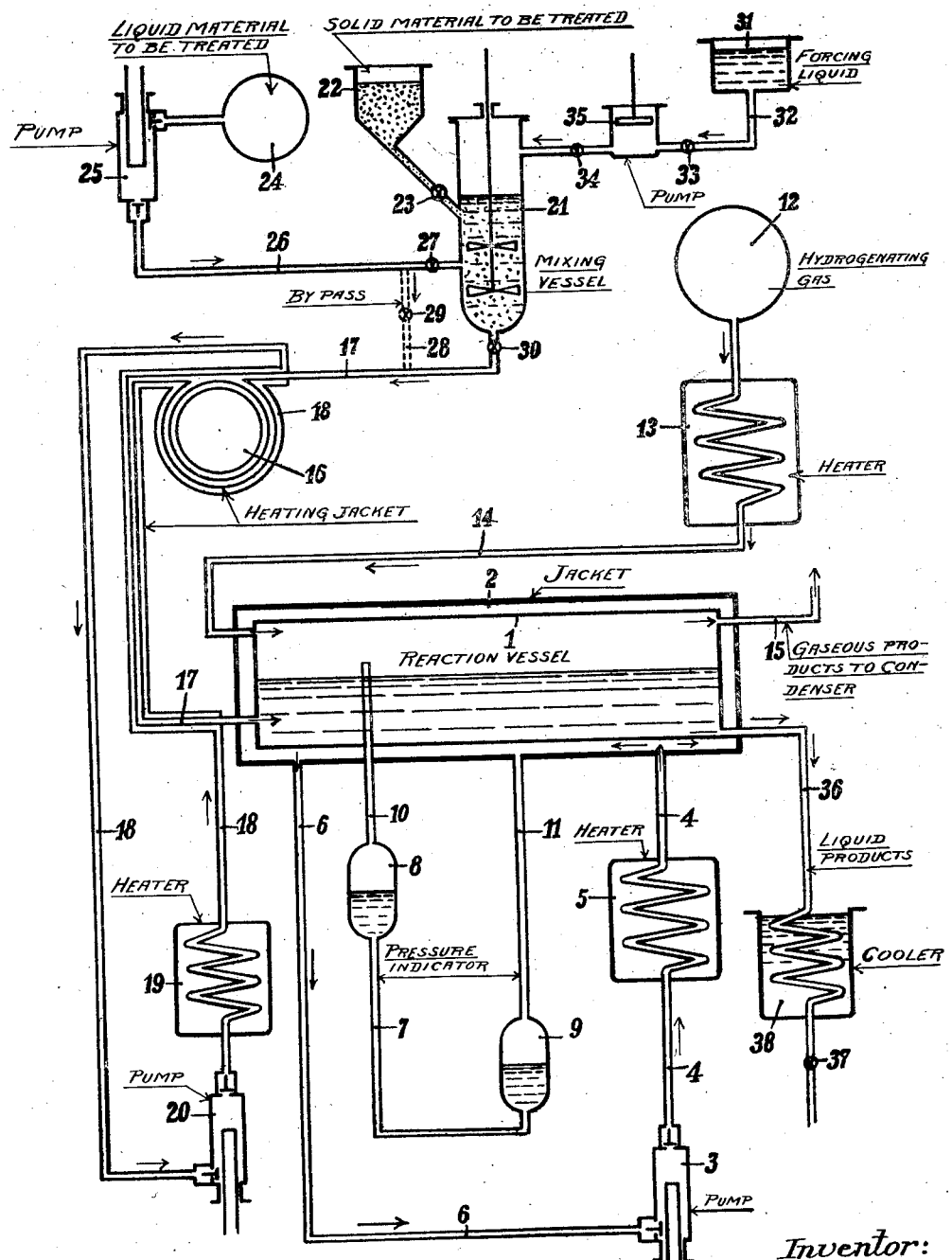

Patented July 13, 1926.

1,592,772

UNITED STATES PATENT OFFICE.

FRIEDRICH BERGIUS, OF BERLIN, GERMANY.

PROCESS FOR TREATING CARBON AND CARBON COMPOUNDS UNDER HEAT AND PRESSURE.

Application filed August 30, 1921, Serial No. 497,038, and in Germany January 23, 1915.

(GRANTED UNDER THE PROVISIONS OF THE ACT OF MARCH 3, 1921, 41 STAT. L., 1313.)

My invention relates to a process for the treatment of carbon and hydrocarbons under pressure and at high temperature (briefly heat pressure treatment). In this process carbon is liquefied under the action of hydrogen and when hydrocarbons are submitted to the heat-pressure treatment with hydrogen (hydrogenation) or without hydrogen the result is to convert hydrocarbons of a high boiling point into those of a lower boiling point. These processes necessitate the treatment of the carbon or of the hydrocarbon with hydrogen at pressures of about 100 atm. and at temperatures of about 400° C. It is of the greatest importance to maintain strictly the most favourable working temperatures for the following reasons:—The highest possible temperature must be adopted for working, as the speed of reaction increases rapidly with rise in temperature. If, however, the working temperature is too high, there is liability of overheating, and consequently of coking, as the splitting of the hydrocarbons then takes place more rapidly than hydrogenation. Direct heating of the reaction vessel (high pressure vessel) by outside firing is unsuitable, as the time required for reaching the desired high temperature is too long, and also, direct heating produces a fall of temperature within the metal wall of the reaction vessel, the outer layer of the said wall assumes a higher temperature than the inner layer, this affecting the resistance of the wall greatly.

This invention principally consists in a mode of heating the reaction vessel and reagents. The high pressure receptacle is made with double walls, and in the jacket space between the two walls a heated and highly compressed heating medium is circulated. The heating medium may be liquid or gaseous, and will be called simply high pressure medium. It is heated to a temperature above the temperature of reaction in a furnace which for reasons of safety is arranged in a separate room. Compressed carbonic acid and other indifferent gases have proved to be the most suitable media. The use of a high pressure medium as a heat transmitter presents the further advantage of relieving the pressure on the walls through which the heat is transmitted to the reaction space which is under high pressure, so that they may be made thin, since the pressure on both sides is fairly equal. If provision is made to maintain a slight, but measurable, difference of pressure between the material in the reaction chamber and the high pressure medium in the jacket it is possible at all times to obtain a reliable indication as to whether or not the walls of the reaction vessel are uninjured. If cracks or breaks occur, the pressure will be equalized, which may be observed from the outside by means of suitable pressure gauges.

The reagents (carbon, hydrocarbons, also hydrogen) instead of being heated in the reaction chamber itself, are heated before being introduced into the latter, to such an extent that the desired reaction temperature is then quickly reached in the reaction chamber. Each of the reagents is heated before it is introduced into the high pressure vessel, preferably nearly to the required reaction temperature or to a temperature only slightly differing from the same, for instance by means of a heating gas, the temperature of which does not exceed to a considerable extent (only to about 50° C.) that of the reaction. Owing to the small difference of temperature, no dangerous overheating of a reagent takes place, even when its supply is choked.

A solid reagent such as carbon is preferably finely reduced in the present process, mixed with liquid reagents and heated with these to the required temperature before the introduction into the reaction vessel. For suspending the solid reagents various liquids may be used, according to the final purpose to be attained. Thus, the yield is materially increased by suspending finely divided carbon in a liquid which has been obtained by a previous carbon hydrogenation, is still capable of being hydrogenated and is liquid at the working temperature.

For ensuring continuous working it is necessary to regulate the speed of discharge of the spent portion of the reaction material. This regulation is difficult as the residue which has to be blown off is thin and fluid at the high temperature, and owing to the high working pressure, it is expelled at a very high speed so that the ordinary regulating parts fail. It is however possible to effect the regulation reliably by increasing the inner friction of the material to be blown out, by cooling it, before proceeding to regulate the speed of discharge. Owing to the cooling, the spent portion becomes a thick fluid, so that the speed of discharge can be easily regulated at will by means of the usual closing parts.

If heavy mineral oils, or hydrocarbons rich in pitch-forming elements, such as for instance Mexican, Californian or Rumanian mineral oils, are treated, the fluid reagent is formed into a paste by an addition of indifferent solid substances such as diatomaceous earth, coke powder, coal ashes which prevent thick-fluid asphalt or coke-like substances from separating during the cracking, such paste being pressed into the high pressure vessel at a temperature at which pasty condition will be maintained.

The addition of such indifferent solid substances may be utilized at the same time for desulphurizing the raw materials, by adding a sulphurbinding substance. For instance, diatomaceous earth or bog iron ore may be impregnated to that end with an alkaline solution, before introducing it into the vessel.

The operation of the process will now be explained with reference to the drawing which shows diagrammatically an installation suitable for carrying out the invention.

1 is a reaction vessel surrounded by a jacket 2. The jacket 2 is built to withstand pressure, whilst the reaction vessel 1 may be made with thin walls. The high pressure medium, such as for instance compressed carbonic acid, is circulated through the jacket space by means of a pump 3 which forces the high pressure medium through a pipe 4 and heater 5 into the jacket 2, whence it escapes through a pipe 6 in order to return to the pump. To enable the walls of the reaction vessel 1 to be made of thin material the vessel is maintained under nearly the same pressure as the jacket space. Pressure differences are indicated by means of any desired measuring device, for instance by a water column 7 in communicating vessels 8, 9 connected by pipes 10 and 11 respectively to the reaction vessel 1 and jacket space 2.

The substances, taking part in the reaction, are supplied to the reaction vessel already heated, that is to say the hydrogenating gas from a container 12 through a heater 13 and pipe 14. Any hydrogenating gas that is not consumed during the reaction, escapes again through a pipe 15 with the reaction products in order to be supplied to a condensing installation (not shown) for the purpose of recovery. The other substances participating in the reaction, hydrocarbons or carbon, are supplied to the reaction vessel 1 through pipes 16, 17 surrounded by a heating pipe 18 and a pump 20 circulates the heating medium through a heater 19.

According to the raw materials used, a tank 21 contains oil or mixtures oil with solid substances. The drawing shows the case in which the hydrocarbons are mixed with solid substances and are to be supplied to the high pressure vessel in the form of a paste. 21 is therefor the mixing vessel to which the solid substances participating in the reaction, for instance carbon in the form of powder, is supplied from a tank 22 provided with a closing part 23. The liquid substance participating in the reaction is supplied from a tank 24 by a pump 25 through a pipe 26 with a valve 27. A pipe 28 with a valve 29 is intended for the cases in which a liquid reagent alone is used. In order to force the paste from the tank 21 into the reaction vessel 1, a plunger pump 35 is provided, to which liquid flows from a tank 31 through a pipe 32 with valves 33, 34. After the mixing is completed, the valves 23, 27, 29 and 33 are closed, the valves 30 and 34 opened, and the pump 35 started.

The spent portion of the reaction material is discharged through pipe 36 and cooled by cooler 38 before reaching the valve 37 by which the speed of discharge is controlled.

Having now particularly described and ascertained the nature of my said invention and in what manner the same is to be performed, I declare that what I do claim as my invention, and desire to secure by Letters Patent, is:—

1. Process of treating carbon and carbon compounds under high temperature and pressure in a closed space which comprises bringing into indirect heat transfer relation thereto a fluid heating medium which is maintained under a correspondingly high pressure while being circulated in a path including a source of heat supply.

2. Process of treating carbon and carbon compounds under high temperature and pressure in a closed space which comprises bringing into indirect heat transfer relation thereto an indifferent gas which is maintained under a correspondingly high pressure while being circulated in a path including a source of heat supply.

3. Process of treating carbon and carbon compounds under high temperature and pressure in a closed space which comprises bringing into indirect heat transfer relation thereto gaseous products of combustion which are maintained under a correspondingly high pressure while being circulated in a path including a source of heat supply.

In testimony whereof, I affix my signature.

FRIEDRICH BERGIUS.